Nov. 25, 1969   D. JACKSON   3,480,402
TIME INDICATOR
Filed Nov. 8, 1966

INVENTOR
DAVID JACKSON
BY
Browne, Schuyler + Beveridge,
Attorneys 3,480,402
TIME INDICATOR
David Jackson, Whetstone, London, England, assignor to Express Dairy Company (London) Limited, London, England
Filed Nov. 8, 1966, Ser. No. 592,778
Claims priority, application Great Britain, Nov. 9, 1965, 47,573/65
Int. Cl. G01n *31/06*
U.S. Cl. 23—254            15 Claims

ABSTRACT OF THE DISCLOSURE

A time indicator formed of an absorbent carrier having absorbed thereon at least one chemical compound which changes color upon exposure to oxygen. The carrier and chemical compound absorbed thereon are protected from ambient oxygen by a non-perforated barrier layer which is transparent and through which atmospheric oxygen can controllably diffuse over a preselected period of time. Thus, when the chemical compound changes color, the preselected period of time is indicated.

---

Figure 1:
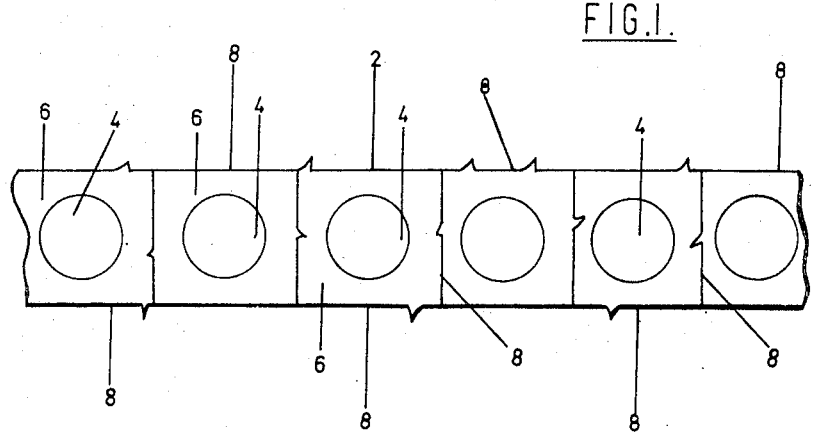

The present invention relates to a time indicator.

It is very often an advantage to have a visual indication attached to goods, e.g., perishable goods, to indicate when a period of time has elapsed after which the goods may no longer be safe to use and should not be offered for sale. This would be particularly of value for attaching to, for example dairy products, such as milk, butter, etc.

According to the present invention there is provided a time indicator comprising an absorbent carrier having absorbed thereon at least one chemical compound which changes colour on exposure to oxygen.

Many indicators which may be used will change colour immediately, or within a short period of time, on exposure to the atmosphere, and it is therefore preferable to coat the absorbent carrier having the chemicals absorbed thereon with a barrier layer which by virtue of its permeability characteristic to the oxygen of the air will allow a certain predetermined or controlled period of time to elapse before sufficient oxygen reaches the chemical or chemicals causing them to change colour.

If desired a number of different chemicals may be used, some or all of which react to the presence of oxygen by changing colour but which react after different periods of time. In this way a graduated time indicator can be produced or this feature can be used for controlling the time period to elapse before a selected colour change takes place.

Alternatively, or additionally, a graduated time indicator can be produced by the use of different barrier layers or different thicknesses of barrier layer so that sufficient oxygen to cause the chemicals to change colour reaches the chemicals in different portions of the carrier after different time periods. The chemicals may be such that they are colourless before exposure and on exposure to the atmosphere one or more of them become coloured. In this way it can easily be seen when the set period of time has elapsed. One example of such compound is leucomethylene blue which is in the colourless reduced form before exposure to the atmosphere and which on exposure to the atmosphere will become coloured blue.

Another dye which has been found useful as the chemical compound is Paradone Yellow G having the color index, Vat yellow 1 part 1 reference 70600 and marketed by L. B. Holliday & Co., Ltd.

A preferred indicator has absorbed on a carrier a mixture of two dyes, namely Ciba Scarlet B.G. (a mixture of Ciba Brilliant Pink F.R. and Ciba Orange R; Ciba Brilliant Pink F.R. having a color index C.I. Vat Red 1 Reference 73360; and Ciba Orange R having a color index C.I. Vat Orange 5 reference 73335) and Cibanone Yellow F.G.N. having a color index, Vat Yellow 1 part 1 reference 70600. Both of these dyes are marketed by Ciba Limited. This combination gives a colour change from blue to orange on exposure to the atmosphere.

Preferred absorbent carrier materials are, for example, filter paper, preferably very high wet strength Whatman Filter Paper No. 115, and blotting paper.

The barrier layer preferably comprises strips of a plastics material placed on both sides of the absorbent carrier and heat sealed together. If desired the plastics strips may be composite strips of two or more layers of two or more plastics materials. For example polyvinyl chloride, polyvinylidene chloride, polyester or nylon may be used as one of the plastics materials, preferably in thickness not greater than approximately 0.001", together with for example polyethylene or polypropylene as another of the plastics materials, preferably in thicknesses of less than 0.003".

Preferred composite strips of plastics materials have been found to be Propafilm "C" 95 g. (a 0.0008" biaxially oriented polypropylene film coated on both sides with a 0.000075" layer of polyvinylidene chloride (P.V.D.C.), thus giving a total film thickness of 0.00095") marketed by Imperial Chemical Industries Limited; B.C.L. coated polypropylene (a 65 g., i.e., a cast 0.00065" polypropylene film coated on both sides with polyvinylidene chloride) marketed by British Cellophane Ltd.

Alternatively a single plastics strip can be used as barrier layer with the interposition of an adhesive to adhere the barrier layers on the two sides of the absorbent material together and the adhesive chosen should be such that the penetration sideways through the adhesive is low and is allowed for in any calculations of the time for the colour change. One suitable plastics strip is Melinex film (a polyester film) marketed by Imperial Chemical Industries Limited.

If desired one side of the absorbent material may be protected by an aluminum layer such that the atmosphere only permeates (i.e., diffuses) through the barrier layer or layers adjoining one face of the absorbent material.

In order to achieve longer times for the colour change, a reducing agent, e.g., sodium hydrosulphite (Hydros) may be adsorbed on the adsorbent carrier.

It has also been found important with many compounds for some moisture to be present in the adsorbent material if a colour change is to occur. For this purpose a humectant such as glycerol for example can be present in the absorbent material. Another humectant which has been used is ethylene glycol.

According to one preferred aspect of the invention there is provided a time indicator comprising an element of absorbent material containing, at least one dyestuff in reduced form and which, on exposure to oxygen, will change colour, a second compound having a greater affinity to oxygen and which does not change colour on exposure to oxygen, a humectant and moisture, sealed in a closely fitting plastics strip container of a material which is not entirely impermeable to oxygen of the atmosphere, such that on exposure to the atmosphere, oxygen permeating into the inside of the container is first taken up by the compound having the greater affinity to oxygen and is then taken up by the dyestuff, whereupon the dyestuff changes colour.

The invention will now be further described by way of example with reference to the following tests, which are purely for the sake of illustration and are not to be understood in any way as being limiting. Although particular chemicals are used in these tests, it is to be understood that any chemical which has a reduced form as well as an oxidised form and displays a distinctive change in colour from one form to the other may be used, e.g. any vat dyestuff normally used in the textile industry and possessing these properties.

A number of tests were made using different strengths of glycerol and hydros. The glycerol and hydros is introduced by rinsing the dyed absorbent carrier. Filter paper was dyed with 10% Ciba Scarlet B.G. and 1% Cibanone Yellow FGN. The time taken for the complete colour change to occur in each case was recorded. The results obtained were as follows:

TABLE 1

| Percent Glycerol in rinse | Time taken for complete colour change (in days) | | | | | |
|---|---|---|---|---|---|---|
| | 20 | | | 40 | | |
| Conc. of hydros in rinse (in gms./litre) | 5 | 10 | 20 | 5 | 10 | 20 |
| 65 g. polypropylene coated with P.V.D.C. both sides | 7 | 7 | 9 | 10 | 19 | 24 |
| 95 g. propafilm "C" | 4 | 6 | 7 | 6 | 11 | 19 |

In a similar test a 100 g. Melinex covered paper containing 40 g./litre. Hydros and 40% glycerol gave a complete colour change in approximately 14 days.

A similar series of tests was carried out using 40% glycerol and different strengths of hydros in an attempt to ascertain the conditions necessary to give total colour change times of approximately 14 days. Two different dyelots (A and B) were used. The results are as follows:

TABLE 2

| Dyelot | Time taken for complete colour change (in days) | | | | | |
|---|---|---|---|---|---|---|
| | A | | | B | | |
| Hydros. in rinse (in gms./litre) | 12.5 | 15 | 17.5 | 12.5 | 15 | 17.5 |
| 95 g. propafilm "C" | 9 | 13 | 15 | 12 | 12 | 15 |

In a further series of tests made in an attempt to produce a constant time taken for the colour change in a number of samples, a number of 18.5 cm. circles of very high wet strength Whatman Filter Paper No. 115 were cut up as accurately as possible into 2″ x 1″ rectangles, using a specially prepared stencil. Each piece weighed between 0.0910 and 0.0940 g. each. The paper rectangles were dyed first with 10% Ciba Scarlet BG Micro Paste, drained and then dyed with 1% Cibanone Yellow FGN 200% paste.

500 ml. of water was heated to 75° C. and 3.12 g. of Turkey-red Oil and 25 ml. sodium hydroxide (66° Twaddle) added, 1.25 g. of dye (Ciba Scarlet) and 12.5 g. hydrosulphite (sodium hydrosulphite) then added. When the solution was a clear orange-red colour it was cooled to 50° C. and 12.5 g. of the paper added. Dyeing was continued at 50° C. for ¾ to 1 hour with frequent stirring. At the end of this time the dye liquor was strained off and the paper was ready for transfer to the Cibanone Yellow dye.

The stock vat was prepared first.

50 ml. of water was heated to 50° C. and 0.1 g. Turkey-red Oil and 3.5 ml. sodium hydroxide (66° Twaddle) added. These were followed by 0.125 ml. dye (Cibanone Yellow) and hydrosulphite (2 g.). When all the dye was completely dissolved the entire stock so prepared was tipped into a previously prepared dyeing vat, prepared by heating 450 ml. water to 50 to 60° C. and adding 0.5 g. hydrosulphite and 4.5 g. sodium hydroxide (66° Twaddle).

The paper which had previously been dyed with Ciba Scarlet was added and dyeing continued at 50 to 60° C. for ¾ to 1 hour with continuous stirring. After dyeing the paper was drained and transferred to a hydrosulphite rinse.

It is to be noted that the amount of paper used gives a goods to liquor ratio of 1:20. The precentage dye concentrations given are percentages of the weight of paper used and not of the total dye bath.

The hydrosulphite rinse was composed of water, glycerol, hydrosulphite and sodium hydroxide. The sodium hydroxide is important as it prevents the hydrosulphite decomposing into $SO_2$ on contact with water. 66° Tw. sodium hydroxide is used at a concentration of 1 ml. NaOh to 1 g. hydrosulphite.

The concentrations of hydrosulphite and glycerol in the rinse and also the quantity of rinse remaining on the absorbent carrier may be varied to suit requirement. An increase in the concentration of hydrosulphite and/or an increase in the amount of rinse remaining on the carrier increases the reduction time of the dye. A concentration of 10 g./litre hydrosulphite and 30% glycerol was, however, used in this series of tests.

The dyed paper, after draining off excess dye liquor and drying on filter paper, was added to the rinse, agitated and left for at least 10 mins. It was then ready for sealing.

Each piece of dyed paper was removed from the rinse, excess rinse shaken off, and put between two pieces of Propafilm "C" 95 g. film (2″ x 3″ to give a ½″ clearance all round) and sealed on three edges as close as possible to the paper. The excess rinse was then squeezed out and the remaining side sealed. It was found that one seal produced a good oxygen proof barrier, though it would not necessarily withstand pulling apart. The time indicators were weighed individually and only those falling within 10 mg. of the average, were kept. (Average weights were around 0.500 g.) By this means it was known that a standard quantity of the rinse had been retained within each indicator.

All samples were hung up individually to allow free access of air. Each sample took approximately 14 days (±1 day) to completely change colour.

Figure 2:
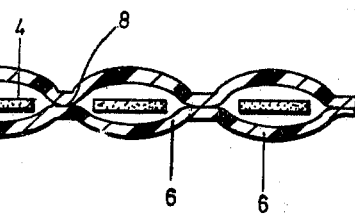

The present invention will now be further described by way of example with reference to the accompanying drawings in which:

FIG. 1 is a plan view of a strip of time indicator according to the present invention, and FIG. 2 is a sectional view of the time indicator of FIG. 1.

Referring to the drawing a time indicator strip generally indicated as 2 comprises a number of pieces 4 of absorbent material each impregnated with a chemical compound which changes colour on exposure to the atmosphere. The chemical compounds used on each piece of absorbent material may be the same or different. A plastics film 6 covers each side of the absorbent material and is heat sealed as at 8 to isolate the various pieces of absorbent material from each other.

Prior to use the strips are kept in an oxygen free atmosphere for example in a nitrogen atmosphere. When required the strip is removed from the oxygen-free atmosphere and as many indicators as required are removed from the strip and attached to the outside of an article for example a box containing perishable goods. Oxygen then permeates the plastic layer 6 at a rate dependent upon atmospheric conditions and the thickness and type of plastic material used to form the layer 6. After a certain period of time, e.g. one week, depending upon the factors mentioned above, sufficient oxygen permeates the absorbed layer 4 to change colour. If more than one chemical is used or if the layer 6 covering the various pieces of absorbent material is of different thickness for each piece of absorbent material the chemical absorbed on the pieces of absorbent material 4 will change colour at different times, e.g. the chemical on one piece will change colour after say one week, the chemical absorbed on another piece will change colour after say 10 days, and the chemical on a further piece of absorbent material will change colour after say 14 days. Thus a graduated time indicator may be produced.

The time indicator may be attached to perishable goods or to the outer container or individual packages containing such goods in any convenient manner. For example the indicators may be provided with one outer surface wholly or partly coated with a contact adhesive; strips of indicators may be wound into reel form with or without a locking strip or individual indicators may be speedily mounted on a backing strip. Yet again an indicator may be attached by an adhesive applied to one side of the indicator and/or to the outer surface of a container or package just prior to its application to such container or package, or it may be attached by heat sealing by direct or indirect heating.

It is also envisaged that a time indicator may be suitably shaped as to be received in a slot or recess or pocket or in a container or package.

If it is desired to keep the indicator for some time before use, then it should be stored under nonoxidising conditions, for example together with an agent, for example, alkaline sodium hydrosulphite, which will take up any oxygen present in the atmosphere surrounding the indicator; or in an inert atmosphere, e.g. nitrogen. A number of indicators may be stored together or each indicator may be stored separately under the non-oxidising conditions until it is desired to attach them to the perishable goods.

I claim:

1. A time indicator comprising an absorbent carrier, said carrier having absorbed thereon at least one chemical compound, which chemical compound changes colour upon exposure to oxygen, the carrier being protected by a non-perforated barrier layer at least part of which is transparent and through at least part of which atmospheric oxygen can pass by diffusion.

2. An indicator according to claim 1, wherein a number of different chemicals are absorbed on said carrier, each of which changes colour after a different period of exposure to oxygen.

3. An indicator according to claim 1, wherein different parts of the carrier are covered with different thicknesses of barrier layer so that sufficient oxygen to cause the chemicals to change colour reaches the chemicals in differrent parts of the carrier after different periods of time.

4. An indicator according to claim 1, wherein one side of the absorbent carrier is covered with an aluminum layer.

5. An indicator according to claim 1, wherein said chemical compound is leucomethylene blue.

6. An indicator according to claim 1, wherein said absorbent carrier has absorbed thereon a mixture of 10% Ciba Scarlet BG and 1% Cibanone Yellow FGN.

7. An indicator according to claim 1, wherein said barrier layer is Propafilm C 95 g., BCL coated polypropylene or Melinex.

8. An indicator according to claim 1 wherein the barrier layer is a plastics material.

9. An indicator according to claim 8, wherein said plastics material is a composite material.

10. An indicator according to claim 9, wherein said composite material comprises polyvinyl chloride or nylon, together with polyethylene.

11. An indicator according to claim 9, wherein said composite material comprises at least two plastics materials selected from the group consisting of polyvinyl chloride, polyvinylidene chloride, polyester, nylon, polyethylene and polypropylene.

12. A time indicator comprising an element of absorbent material containing, at least one dyestuff in reduced form and which, on exposure to oxygen, will change colour, a second compound having a greater affinity to oxygen and which does not change colour on exposure to oxygen, a humectant and moisture, sealed in a closely fitting plastics strip container of a material which is not entirely impermeable to oxygen of the atmosphere, such that on exposure to the atmosphere, oxygen permeating into the inside of the container is first taken up by the compound having the greater affinity to oxygen and is then taken up by the dyestuff, whereupon the dyestuff changes colour.

13. An indicator according to claim 12, wherein at least one of said dyestuffs is a vast dyestuff.

14. An indicator according to claim 12, wherein said second compound comprises sodium hydrosulphite.

15. An indicator according to claim 12, wherein said humectant comprises glycerol.

References Cited

UNITED STATES PATENTS 3,002,385 10/1961 Wahl, et al.
3,018,611 1/1962 Biritz.

OTHER REFERENCES

Knecht, E. et al.: Manual of Dyeing, vol. II (1945), pp. 484–5.

Venkataraman, K.: The Chemistry of Synthetic Dyes, vol. II, p. 1237 (1952).

MORRIS O. WOLK, Primary Examiner

E. A. KATZ, Assistant Examiner

U.S. Cl. X.R.

58—1; 99—192; 116—114